United States Patent [19]

Yagasaki et al.

[11] Patent Number: 5,542,091
[45] Date of Patent: Jul. 30, 1996

[54] DEVICE FOR SELECTING AND REARRANGING DATA BASED ON ARITHMETIC OPERATION

[75] Inventors: Toshiaki Yagasaki, Hino; Shugorou Ueno, Tokyo, both of Japan

[73] Assignee: Canon Kabushiki Kaisha, Tokyo, Japan

[21] Appl. No.: 460,836

[22] Filed: Jun. 5, 1995

Related U.S. Application Data

[63] Continuation of Ser. No. 279,076, Jul. 22, 1994, abandoned, which is a continuation of Ser. No. 577,578, Sep. 5, 1990, abandoned.

[30] Foreign Application Priority Data

Sep. 7, 1989 [JP] Japan .................................. 1-230418

[51] Int. Cl.⁶ .................................................. G06F 7/24
[52] U.S. Cl. ............................ 395/600; 364/DIG. 1; 364/222.9
[58] Field of Search ............................................. 395/600

[56] References Cited

U.S. PATENT DOCUMENTS

| | | | |
|---|---|---|---|
| 3,587,057 | 6/1971 | Armstrong | 395/600 |
| 4,090,249 | 5/1978 | Chen et al. | 395/600 |
| 4,295,206 | 10/1981 | Cain et al. | 395/600 |
| 5,226,174 | 7/1993 | Yagasaki et al. | 395/800 |
| 5,303,381 | 4/1994 | Yagasaki et al. | 395/800 |

*Primary Examiner*—Thomas M. Heckler
*Attorney, Agent, or Firm*—Fitzpatrick, Cella, Harper & Scinto

[57] ABSTRACT

A data selection device which selects or rearranges data on the basis of the result of an arithmetic operation obtained by an arithmetic operation unit having a storage device for storing data with a capacity corresponding to the amount of data to be selected, an update device for updating the contents of the storage device on the basis of a comparison between the data stored in the storage device and the result of the arithmetic operation, and an initialization device for initializing the storage device according to the ascending or descending order of the output result.

14 Claims, 5 Drawing Sheets

FIG. 1A1
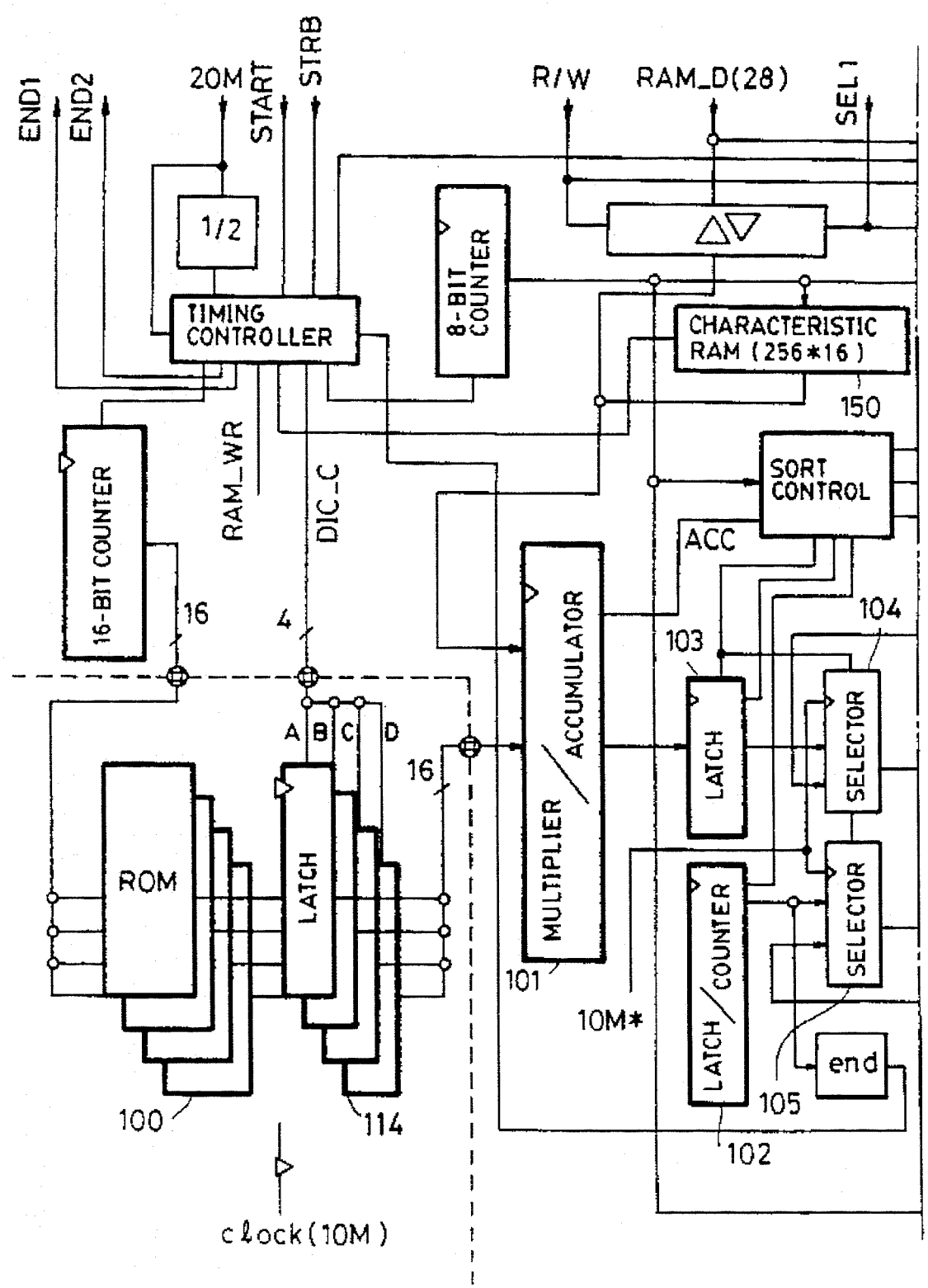

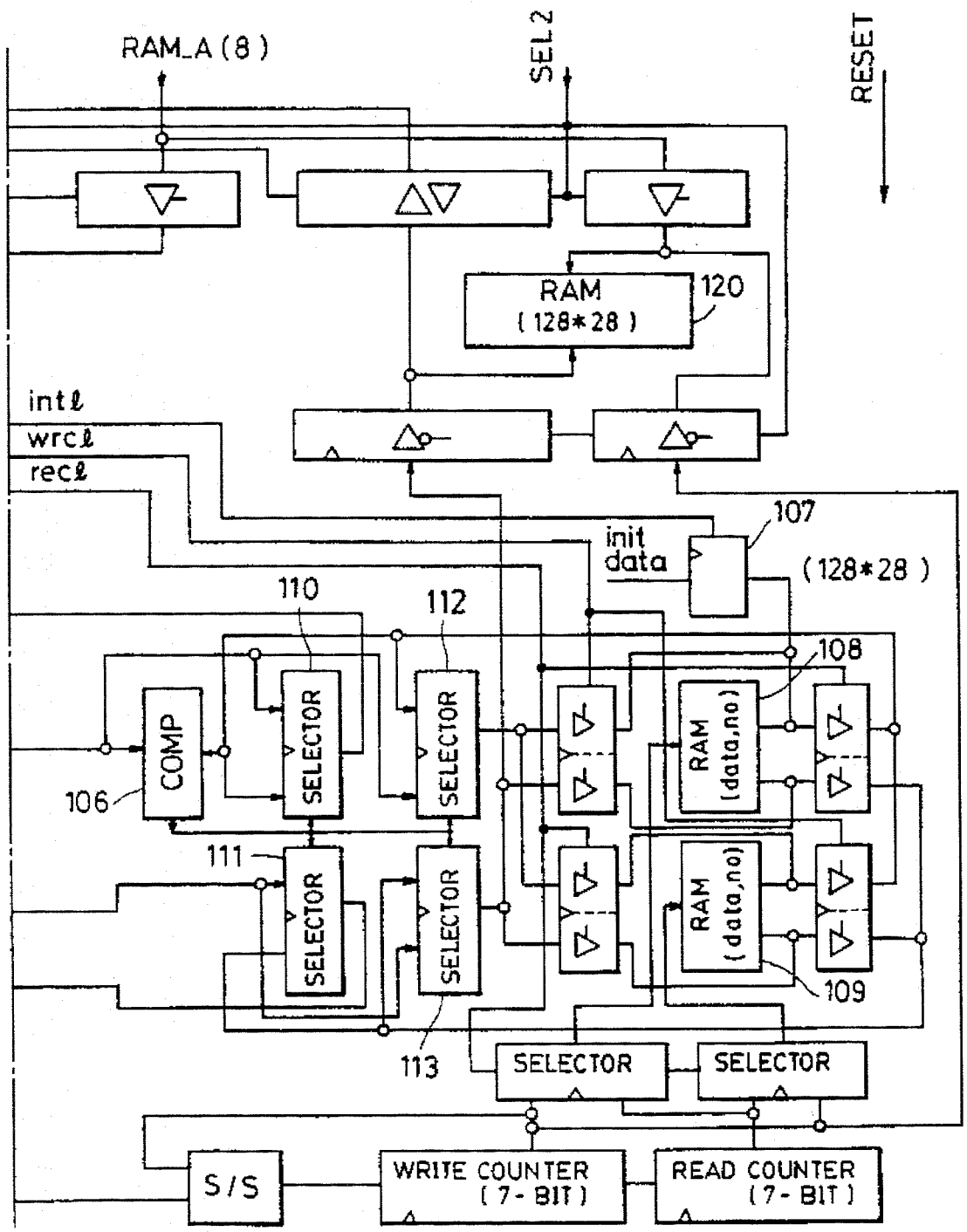

| ADDRESS PORTION | DATA PORTION |
|---|---|
| 0 0 0 0 | 0 0 0 0 |
| | |
| 1 0 0 0 | 2 1 4 4 |
| | |
| 1 2 3 4 | 3 2 7 7 |
| | |

DEVICE FOR SELECTING AND REARRANGING DATA BASED ON ARITHMETIC OPERATION

This application is a continuation of application Ser. No. 08/279,076, filed Jul. 22, 1994, now abandoned, which was a continuation of application Ser. No. 07/577,578 filed Sep. 5, 1990, now abandoned.

BACKGROUND OF THE INVENTION

2. Field of the Invention

The present invention relates to a data selection device and, in particular, to a data selection device which selects a plurality of data, as candidate data, at high speed after performing a discrimination arithmetic-operation in a character recognition device or the like.

2 Description of the Related Art

In the prior art, the following methods of sorting for selecting candidate data after an arithmetic operation in a device equipped with a data selection device, namely, a character recognition device, are known.

A memory space having an address width corresponding to the range of all input data is prepared, and using a calculated result as an address, is accessed. An identifier for the computed result, for example, a JIS code in the case of a character, is stored in the accessed address. At the termination of all arithmetic operations, identifiers are output starting with a smaller address when in ascending order and starting with a greater address when in descending order.

At this point, as an example of selecting candidate data, the configuration of the discrimination section of a conventional character recognition device is shown in FIG. 3A. In a dictionary 200, data is stored which is referred to with respect to input data 201 and identifiers composed of JIS codes. When the input data 201 is input, dictionary 200 is accessed and data 202 and JIS codes 203 are output. Data 201 and 202 are input to an address bus 207 after they are calculated in a computing unit 204, and the JIS code 203 is input to a data bus 208. Then, a memory 206 is accessed and the JIS code 203 is written using the result of the computation obtained by the computing unit 204 as an address. The configuration of the memory at this time is shown in FIG. 3B and the JIS code is entered in the data portion.

However, according to the above-mentioned conventional example, where the discriminated and computed result is output as the same numeric data more than once, the older entry is overwritten, i.e., former identifier is erased. On the other hand, if it is arranged that when the result is written once, it will not be overwritten, then data to be written subsequently will be lost. Where data is written once, even if the adjacent address is accessed and data is written, the construction becomes complex and the result of the arithmetic operation will not have a one-to-one correspondence. Also, the entire address space of the memory must be accessed. That is, since accessing a portion where data is not written is required, much of the accesses will become meaningless. It is required that the range of data of the result of an arithmetic operation must be known beforehand, and an address space corresponding to that range must be provided, with the result that quite a large RAM will be needed. Of course, problems of high speed and increased cost for that purpose or increased size of tape, when tapes are used, will arise.

Where data is read out in ascending or descending order as a list of data, the need to control the decrement or increment of an address will arise. Further, only identifiers can be read out and reading out data in the identifier (corresponding to an address in this case) cannot be performed. Particularly, a reject operation may sometimes be performed on the basis of the above-mentioned result of the computation in an application with the character recognition mentioned above. However, it cannot be used in such case.

SUMMARY OF THE INVENTION

The present invention eliminates the above-mentioned conventional drawbacks. An object of the present invention is to provide a data selection device which selects data at high speed in a simplified arrangement. Another object of the present invention is to provide a data selection device which rearranges and selects data at high speed in a simplified arrangement. A further object of the present invention is to provide a data selection device which rearranges and selects data at high speed without requiring a large storage section. A still further object of the present invention is to provide a data selection device which rearranges and selects data, and which outputs data containing significant information.

The present invention comprises a storage means for storing data, with a capacity corresponding to the amount of data, a modifying means for modifying the contents of the storage means on the basis of a comparison between data stored in the storage means and the result of an arithmetic operation, and an initialization means for initializing the storage means in correspondence to an ascending or a descending order of the result of the output, in which the initialization means initializes differently in correspondence to the case of the data being signed or unsigned. The data selection device includes a replacement means for replacing a maximum value or a minimum value not exceeding a predetermined range with the result of an arithmetic operation when the result of the arithmetic operation exceeds a predetermined range, and an identifier addition means for adding an identifier to the result of the arithmetic operation. Different arithmetic operations are performed on a replacement value by the replacement means or an identifier by the identifier addition means in correspondence to the ascending or descending order, and the upper and lower limits of a predetermined range.

These and other objects, features and advantages of the present invention will become clear when reference is made to the following description of the preferred embodiments of the present invention, together with reference to the accompanying drawings.

BRIEF DESCRIPTION OF THE DRAWINGS

FIGS. 1A1 and 1A2, connected as shown in FIG. 1A, are a view illustrating the arrangement of a data selection device in this embodiment;

FIG. 2 is a view illustrating an example of the format of the output from the data selection device of this embodiment;

DESCRIPTION OF THE PREFERRED EMBODIMENTS

The embodiments of the present invention will be explained hereinunder with reference to the accompanying drawings.

The data selection device of the present invention comprises a comparator which can detect a higher or lower output from an arithmetic operation unit, a selector which switches output data on the basis of the result of the comparator, and a RAM in which the result is stored.

Figure 1B:
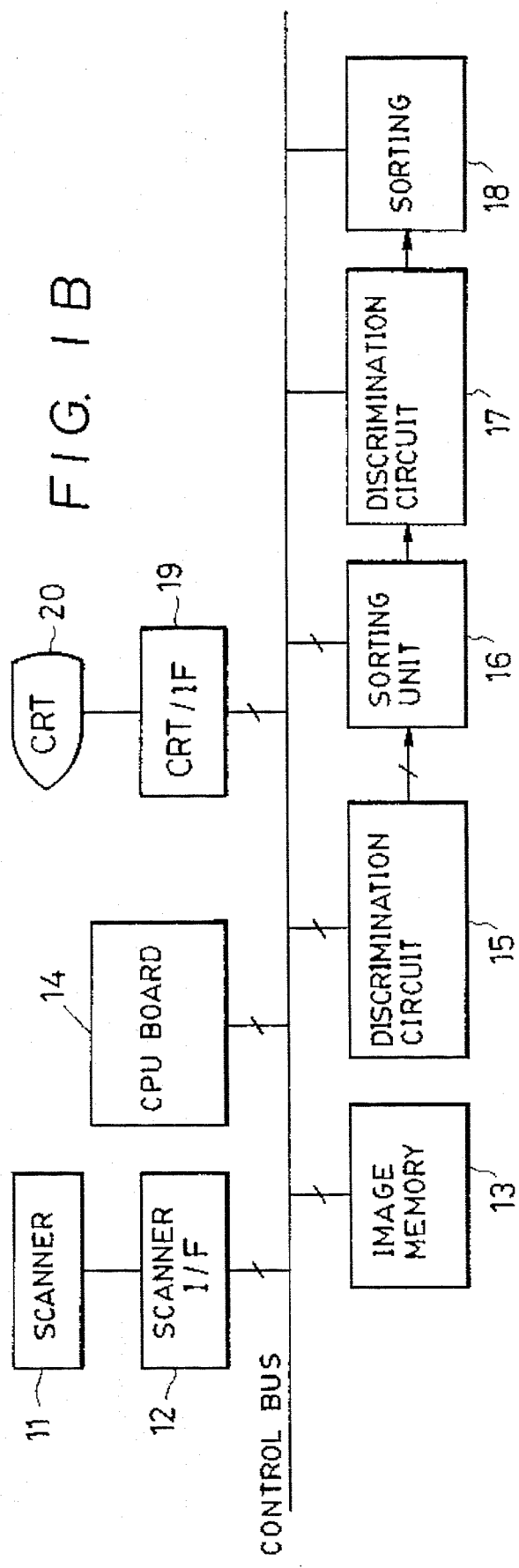
FIG. 1B is a block diagram illustrating an example in which the data selection device of this embodiment is applied to a voice sound storage device.

FIG. 1B is the configurational view of a character recognition device in which the data selection device of this embodiment is implemented as a discrimination circuit 15 and a sorting unit 16. In the figure, a scanner 11 accepts image data (text, etc.), which is stored in an image memory 13 through a control bus via a scanner interface 12. Images stored in this image memory 13 are sliced by a CPU board 14 character by character and transferred to the discrimination circuit 15. An identifier and the result of the arithmetic operation are output to the sorting unit 16 from discrimination circuit 15. Sorting is performed in the sorting unit 16, a can then be executed in a discrimination circuit 17 and a sorting unit 18 also. Sorting performed by the first discrimination circuit 15 is called major sorting and that performed by the second discrimination circuit 17 is called minor sorting. Of course, it does not pose any problem if the output of sorting section 16 is treated as the final output.

FIG. 1A is a block diagram illustrating an arrangement of the data selection device in this embodiment. A description will be given of this below. The portion having a thick frame corresponds to the discrimination circuit 15 in FIG. 1B and the portion having a thin frame corresponds to the sorting unit 16 in FIG. 1B. Numeral 100 denotes dictionary ROMs used in the discrimination circuit, with four ROMs being used in the example. The data is input to an arithmetic operation unit 101 via a latch 114. Regarding the other input data, after passing through an address bus RAM_A and a data bus RAM_D, a characteristic RAM 150 is selected by a signal SEL1 from the CPU and the data is stored in the characteristic RAM 150. When the data is stored, the arithmetic operation unit 101 begins to operate in response to a START signal from outside.

This result is output to a latch 103 and is incremented for every output. The output of latch 103 is input to selectors 104 and 105 together with the output of the latch/counter 102. Among the outputs, only the result of the arithmetic data is input to the comparator 106. Meanwhile, a value in accordance with a mode is stored in RAMs 108 and 109 as initial data from latch 107 during the first arithmetic operation at starting time. At this time, the identifier is unknown.

The initialization of RAMs 108 and 109 will now be explained. The initialization of the above-mentioned RAMs is performed in accordance with the condition of ascending or descending order, or signed or unsigned, etc., when a first arithmetic operation is performed on input data. In the case of ascending order (in the order from smaller to larger) and signed data, the entire memory is set to 7FFFH (for 16-bit), and in the case of unsigned data, data of FFFFH (for 16-bit) is stored in a RAM. Likewise, in the case of descending order (in the order from larger to smaller), the RAM is formed in such a way that signed 8000H or unsigned 0000H is stored. These are maximum/minimum values output from the arithmetic operation unit. When the data is the same, the output of the result of the arithmetic operation is stored and therefore the contents of the RAM required for output should be allocated and a RAM having a large capacity need not be used.

In addition, when the output of the arithmetic operation unit overflows or underflows, a maximum value is output on overflow and a minimum value is output on underflow, thus limiting the width of data. Data values exceeding this range are rejected in applications, as in the above-mentioned character recognition device, and have no meaning. Therefore, a maximum value and a minimum value are substituted, thereby narrowing the width of data.

Also, the subsequent operations can be applied by nullifying the maximum and minimum values and permitting data output other than these values.

Data input to comparator 106 when the first arithmetic operation is terminated is read out from the initialized RAMs 108 and 109 and input to another input of the comparator 106. At this time, the result of the arithmetic operation and the output from the RAM mentioned above is input to selectors 110 and 112, respectively. The output will be data that differs depending on the result of the comparator 106. That is, in the case of ascending order, the output of the selector 110 is the data which is larger at the comparator 106, and the output of the selector 112 is the data which is smaller, which is then stored in the RAMs 108 and 109. Meanwhile, at the same time, an identifier is input to selectors 111 and 113. The identifier having a larger datum in the same operation, is input to the selector 111 and the identifier having a smaller datum is stored in the RAMs 108 and 109. The RAMs 108 and 109 are classified into those for reading out and writing in and are switched at every arithmetic operation. Further, every result of the arithmetic operation device is stored in a RAM 120 at writing time.

Figure 2:
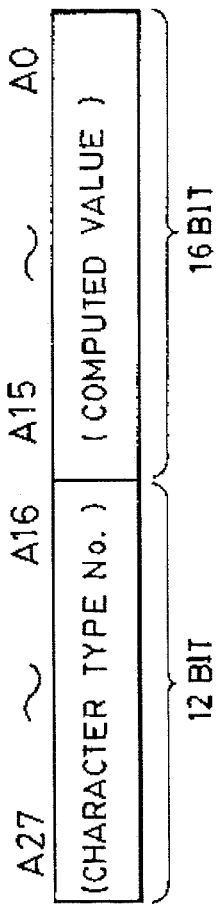
Figures 3A, 3B:
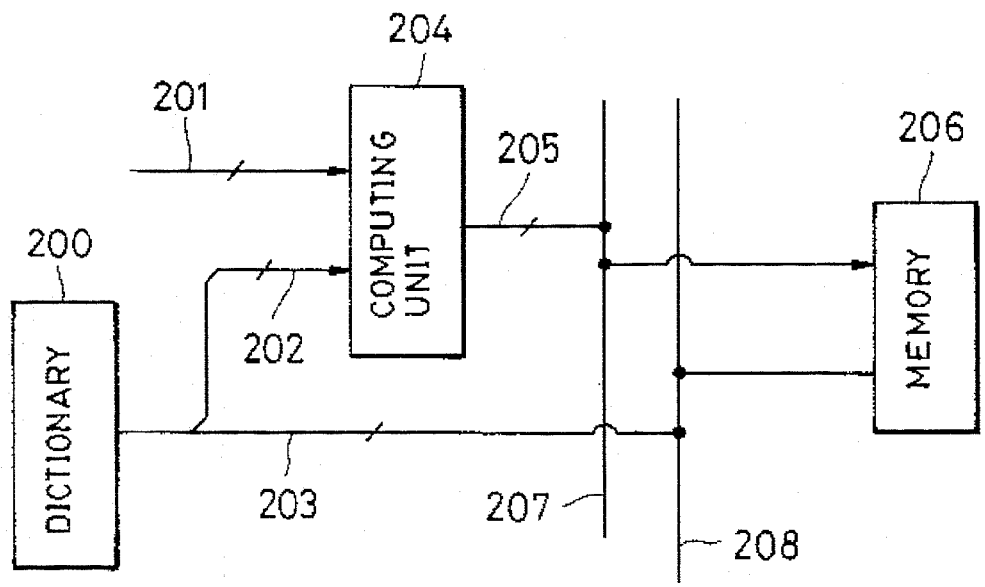
FIG. 3A is a view illustrating the arrangement of the discrimination section of a conventional character recognition device.
FIG. 3B is a view illustrating the arrangement of the memory in FIG. 3A.

When the above-mentioned operations are terminated, the final result is output from RAM 120 via the address bus RAM_A and the data bus RAM_D. At this time, RAM 120 is selected by a signal SEL2 from the CPU. A data format in the RAM 120 is shown in FIG. 2.

Figure 4:
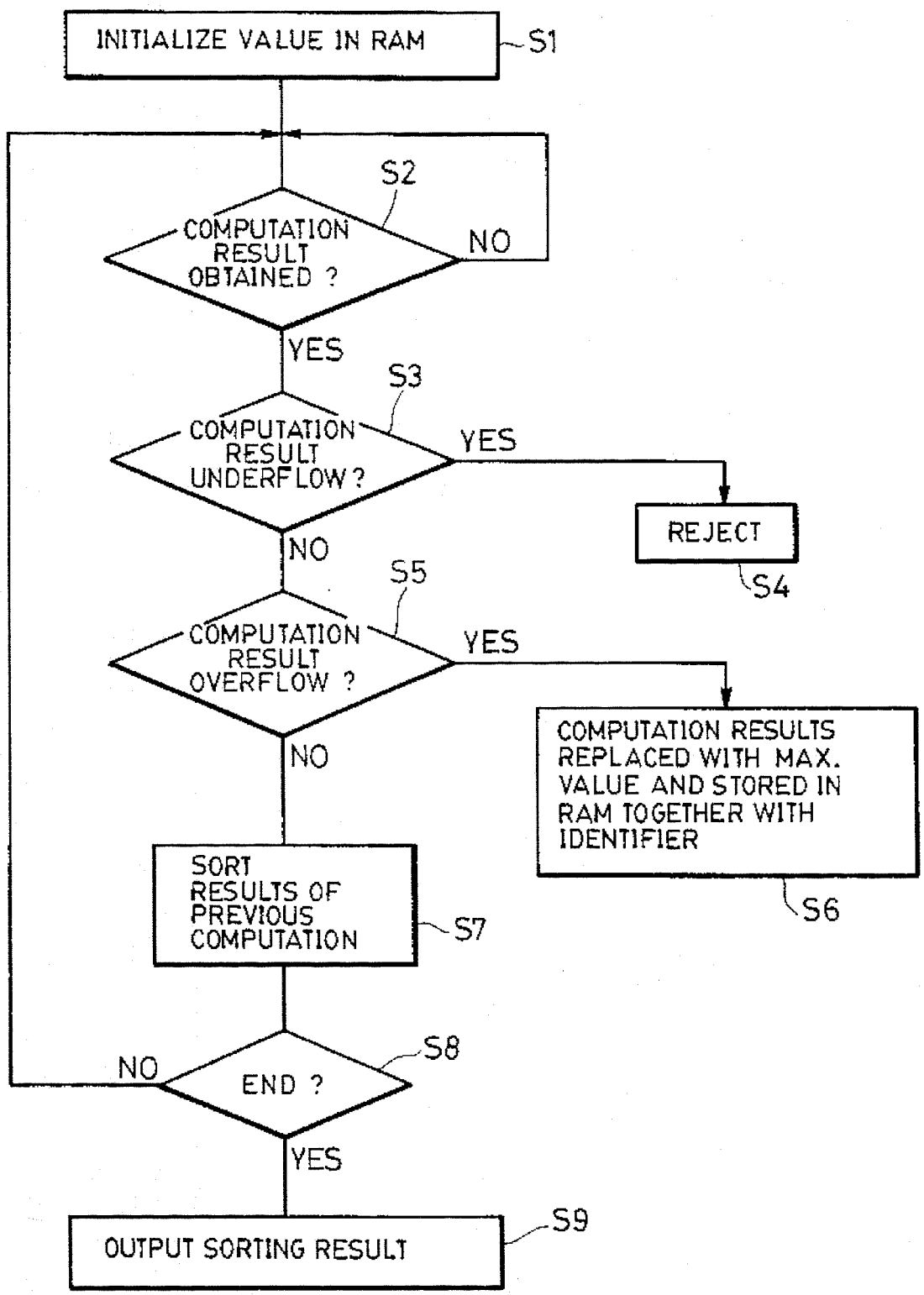
FIG. 4 is a flowchart showing the flow of the operation in the case of descending order and unsigned.

The flow of the operation in the case of descending order and unsigned in the character will now be explained with reference to the flowchart of FIG. 4.

First, the RAMs 108 and 109 are initialized to 0000H (S1). An arithmetic operation on image data of one character sliced by the CPU board 14 and dictionary data in the characteristic RAM 150 is performed in the arithmetic operation unit 101. When this arithmetic operation is terminated (S2), it is determined whether or not the result of the arithmetic operation is an underflow (a value smaller than 0000H) (S3). On underflow, the result of the arithmetic operation is rejected (S4). If not underflow, it is determined whether or not the result of the arithmetic operation overflows (a value greater than FFFFH) (S5). On overflow, the result of the arithmetic operation is stored as FFFFH in the RAM together with the identifier (S6). If not overflow, the results of the arithmetic operations up to now are sorted (S7). When arithmetic operations regarding all the data in the characteristic RAM 150 are terminated, the operation for selecting candidate data of the image data is judged to be terminated (S8) and the result of the sorting is output (S9).

This embodiment has the following advantages:

1. Because an identifier and the result of an arithmetic operation in accordance with the identifier are output as data outputs, operations such as a rejection in response to the data are facilitated.

2. Even if duplicate values occur as data is output, the data will not be lost.

3. The size of the data can be made smaller during overflow and underflow operations regarding minimum/maximum values.

4. Because output data are stored sequentially, the reading-out of data is easy and it is possible to manage it with a smaller data area.

According to the present invention, a data selection device capable of selecting data at high speed in a simplified arrangement can be offered. Also, a data selection device which rearranges and selects data at high speed in a simplified arrangement can be offered. Also a data selection device which rearranges and selects data at high speed without requiring a large storage section can be offered. A data selection device which rearranges and selects data at high speed and which outputs data containing significant information can also be offered. More specifically, since an identifier and the result of an arithmetic operation in accordance with the identifier are output as data outputs, operations such as a rejection in response to the data are facilitated. Even if duplicate values occur as data outputs, the data will not be lost. The size of the data can be made smaller during overflow and underflow operations regarding minimum/maximum values. Because output data are stored sequentially, the reading-out of data is easy and it is possible to manage with a smaller data area.

Many different embodiments of the present invention can be made without departing from the spirit and scope thereof, therefore, it is to be understood that this invention is not limited to the specific embodiments thereof except as defined in the appended claims.

What is claimed is:

1. A data selection device, said device comprising:

storage means for storing data and having a capacity of being able to store an amount of data to be selected;

arithmetic operation means for performing an arithmetic operation on the data stored in said storage means;

comparing means for comparing the data stored in said storage means and a result of the arithmetic operation, a comparison result provided by said comparing means being used subsequently in selection of data;

update means for updating the data stored in said storage means, based on the comparison between the data stored in said storage means and the result of the arithmetic operation; and initialization means for initializing data stored in said storage means to a predetermined value according to an order in which the data is to be read out of said storage means, when a first arithmetic operation is performed by said arithmetic operation means.

2. A data selection device according to claim 1, further comprising replacement means for providing a maximum value or a minimum value of data to said comparing means in place of the result of the arithmetic operation when the result of the arithmetic operation output by the arithmetic operation unit exceeds a predetermined range.

3. A data selection device according to claim 2, wherein the maximum or minimum value of data stored by said replacement means is selected in correspondence to ascending or descending order, and an upper and a lower limit of the predetermined range.

4. A data selection device according to claim 1, further comprising an identifier addition means for adding an identifier to the result of the arithmetic operation output by the arithmetic operation unit.

5. A data selection device according to claim 4, wherein the identifier from said identifier addition means is selected in correspondence to ascending or descending order, and an upper and a lower limit of the predetermined range.

6. A data selection device according to claim 1, wherein said initialization means initializes with a different predetermined value depending on whether or not the data is signed or unsigned.

7. A data selection device according to claim 1, further comprising replacement means for storing a substitution value selected from the data stored in said storage means when the result of the arithmetic operation output by the arithmetic operation unit exceeds a predetermined range.

8. A computer implemented data selection method, said method comprising the steps of:

storing data in storage means, the storage means having a capacity being able to store an amount of data to be selected;

performing an arithmetic operation on the data stored in the storage means;

comparing the data stored in the storage means and a result of the arithmetic operation, a comparison result provided by said comparing step being used subsequently in selection of data;

updating data in the storage means, based on the comparison between the data stored in the storage means and the result of the arithmetic operation; and data stored in the storage means to a predetermined value according to an order in which the data is to be read out of said storage means, when a first arithmetic operation is performed.

9. A data selection method according to claim 8, further comprising a replacement step for providing a maximum value or a minimum value of data to be compared in said comparing step in place of the result of the arithmetic operation when the result of the arithmetic operation output by said arithmetic operation step exceeds a predetermined range.

10. A data selection method according to claim 9, wherein the maximum or minimum value of data stored by said replacement step is selected in correspondence to ascending or descending order, and an upper and a lower limit of the predetermined range.

11. A data selection method according to claim 8, further comprising a step for adding an identifier to the result of the arithmetic operation output by the arithmetic operation unit.

12. A data selection method according to claim 11, wherein the added identifier is selected in correspondence to ascending or descending order, and an upper and a lower limit of the predetermined range.

13. A data selection method according to claim 8, wherein said initialization step initializes with a different predetermined value depending on whether or not the data is signed or unsigned.

14. A data selection method according to claim 8, further comprising a step for storing a substitution value selected from the data stored in the storage means when the result of the arithmetic operation output by the arithmetic operation unit exceeds a predetermined range.

* * * * *

UNITED STATES PATENT AND TRADEMARK OFFICE
CERTIFICATE OF CORRECTION

PATENT NO. : 5,542,091
DATED : July 30, 1996
INVENTOR(S) : TOSHIAKI YAGASAKI ET AL.

It is certified that error appears in the above-identified patent and that said Letters Patent is hereby corrected as shown below:

COLUMN 1

Line 11, "2." should read --1.--.

COLUMN 3

Line 26, "a can" should read --and can--.

COLUMN 4

Line 3, "RAM required" should read --RAM are replaced. Further, only the area of a RAM--.
Line 29, "datum" should read --datum,--.

COLUMN 6

Line 32, "data" should read --initializing data--.

Signed and Sealed this

Twelfth Day of November, 1996

Attest:

BRUCE LEHMAN

*Attesting Officer*   *Commissioner of Patents and Trademarks*